March 16, 1954  D. B. CAPLES ET AL  2,672,392
ULTRASONIC FLAW DETECTING AND RECORDING SYSTEM
Filed Sept. 17, 1951  3 Sheets-Sheet 1
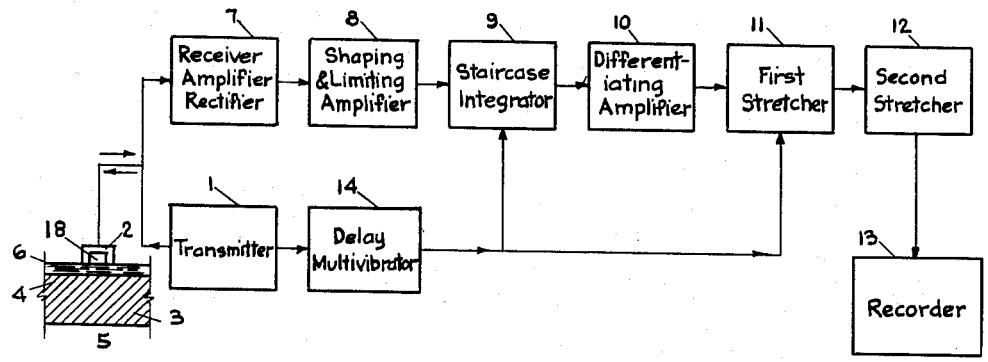
Fig. 1
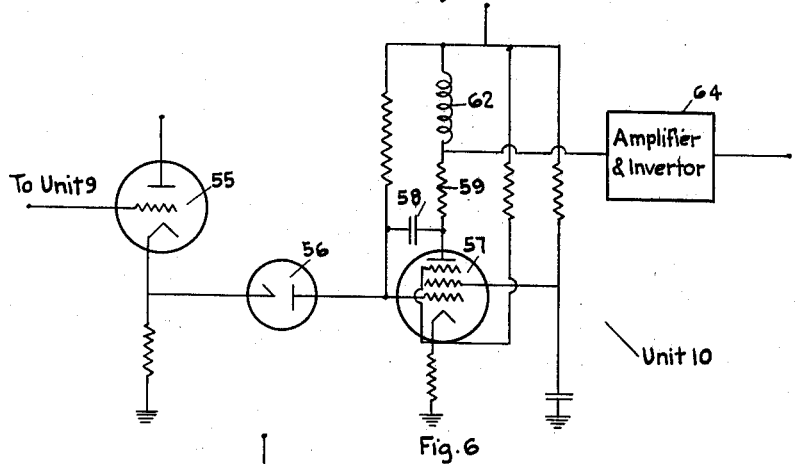
Fig. 6
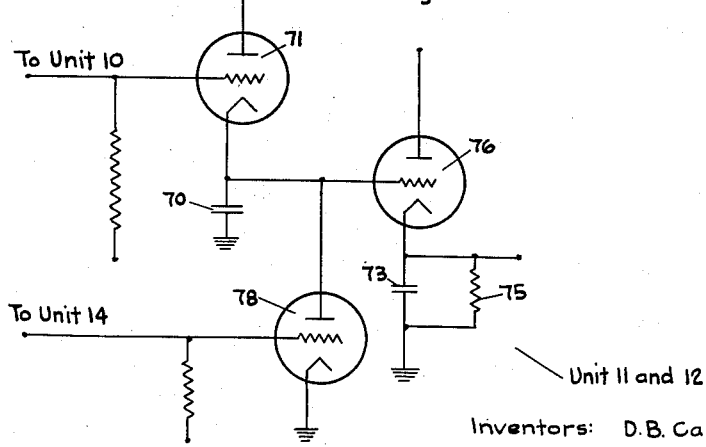
Fig. 7
Inventors: D.B. Caples
R.B. Willoughby
P.L. Datt
By: 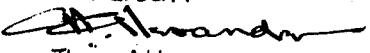
Their Attorney March 16, 1954     D. B. CAPLES ET AL     2,672,392
ULTRASONIC FLAW DETECTING AND RECORDING SYSTEM
Filed Sept. 17, 1951                        3 Sheets-Sheet 3

Inventors: D. B. Caples
R. B. Willoughby
P. L. Datt
By: Their Attorney

Patented Mar. 16, 1954

2,672,392

UNITED STATES PATENT OFFICE 2,672,392

ULTRASONIC FLAW DETECTING AND RECORDING SYSTEM

Donald B. Caples, Berkeley, Richard B. Willoughby, Concord, and Paul L. Datt, Oakland, Calif., assignors to Shell Development Company, Emeryville, Calif., a corporation of Delaware Application September 17, 1951, Serial No. 246,896

6 Claims. (Cl. 346—33)

This invention pertains to recording methods and systems, and relates more particularly to a method and a system for accurately recording the difference in time between successive events, such, for example, as the arrival to a recorder of successive signals or pulses.

In order to simplify the following exposition, this invention will be described and illustrated in regard to its application in ultrasonic testing methods, for which it is especially well adapted, it being well understood, however, that it is in no way limited thereto, but may be used for the purpose of recording phenomena or events of other and different types, as will be clear to those familiar with the art from the description hereinbelow.

It has been hitherto known to use nondestructive ultrasonic testing methods wherein a pulse is transmitted through the body or medium under test, and information as to the thickness or shape of said body, or the presence of any flaws therein, is obtained from a study of properly received reflections of the transmitted pulse.

Considerable difficulties have been encountered in recording the results of ultrasonic testing. Devices of the oscilloscope type give only temporary, non-permanent images. Oscillograph records usually require a time delay for purposes of photographic development. Pen and chart recorders have often too slow a reaction and lack the desired accuracy, especially when measuring intervals between high frequency effects.

It is therefore an object of this invention to provide a method permitting to form electrically a permanent and accurate record of the time spacing between rapidly succeeding events or pulses.

It is also an object of this invention to provide a method and a system for measuring the frequency of rapidly following events or pulses, expressing said frequency as a voltage rising at a rate proportional to said frequency, converting said rising voltage to a second voltage having an amplitude value proportional to said rate of rise, and maintaining said voltage amplitude for a period of time sufficient to permit said voltage to actuate a recorder when applied to the input of said recorder.

These and other objects of the present invention will be understood from the following description taken with reference to the attached drawings, wherein Fig. 1 is a block diagram of the present system.

Fig. 6 is a schematic circuit of the smoothing and differentiating amplifier unit 10 of Fig. 1.

Fig. 7 is a schematic circuit of the stretcher units 11 and 12 of Fig. 1.

Figure 2:
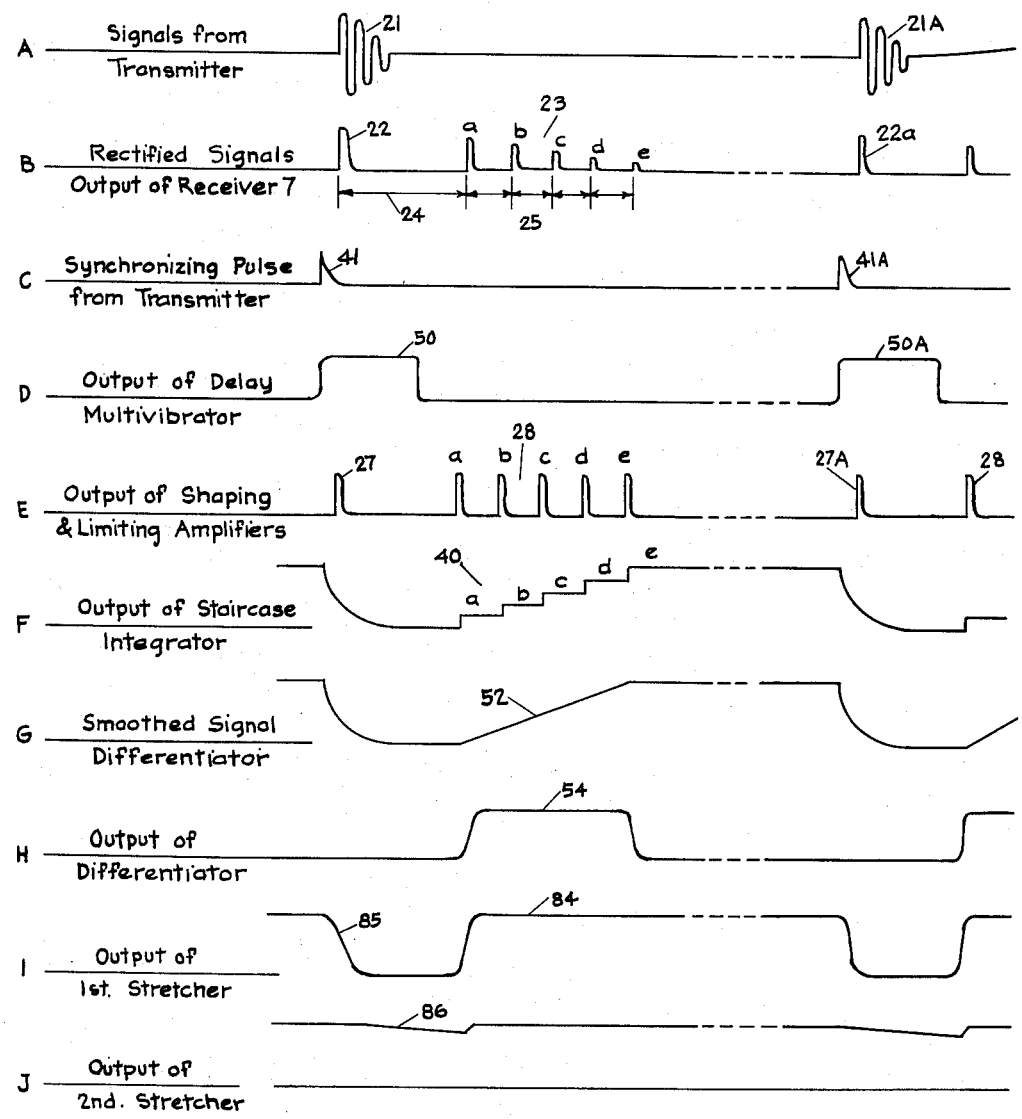
Fig. 2 is a diagram of the pulse or wave shapes obtaining at the various units of the present system.

Referring to Fig. 1, pulses generated by a transmitter 1 are applied, by means of a transducer 2, such as a piezo-electric crystal, to a body under test 3, said body having a first or front surface 4 and a second or rear surface 5. The body 3 may be in direct contact with the transducer 2 or may be separated therefrom by a coupling medium 6 such as water, oil, etc. The transmitter 1, transducer 2 and the nature of the pulses applied thereby to the body 3 may be, for the purposes of this description, of the type disclosed in U. S. Letters Patent Nos. 2,280,226 and 2,398,701, said pulses or signals being shown at 21 on line A in Fig. 2 of the present drawings.

The transducer 2 may serve both to transmit the pulses 21 to the body 3 and to receive the reflected pulses or signals therefrom, although, if desired, a special receiver, either separate or combined therewith, as diagrammatically shown at 18, may be used for this last purpose. The received signals, for example, pulses reflected from the front and rear surfaces 4 and 5 of body 3, are conveyed to the receiver, amplifier and rectifier unit 7, which receives or detects, amplifies and rectifies said pulses in a manner well known in the art.

The voltage pattern appearing at the output of unit 7, is shown on line B in Fig. 2. The pulse 21, transmitted by the transducer, appears, after rectification, as a signal 22 and the pulse energy reflected from the front surface 4 of the body 3 appears as a signal 23a. The spacing 24 between pulses 22 and 23a is thus the time required for the ultrasonic pulse to travel through the liquid medium 6 to the front surface 4 of the body 3 and back to the transducer 2. The term ultrasonic is applied to the pulse 21 as consisting of a train of vibrations of high frequency, such as from 100 kilocycles to 20 megacycles per second, individual groups or trains of pulses 21 being in turn generated by the transmitter 1 at a suitable frequency such as from 100 to 10,000 trains of pulses per second.

Part of the energy of pulse 21 is not reflected toward the transducer from the front surface 4, but penetrates the body 3 and is then reflected from the rear surface 5, resulting after passage through the unit 7, in the rectified pulse 23b. Part of the pulse energy of 23b, traveling toward the transducer, is again reflected at the front surface 4 back into the body 3, and then back again towards the transducer at the rear surface 5 to produce a pulse 23c, etc., until these pulses gradually die out to a value too small to be significant.

The spacing 25 between the fronts of the adjacent pulses 23a, 23b, 23c, etc., thus represents the round trip time between the two faces 4 and 5 of the body 3, and is therefore directly proportional to the ultrasonic path length through the body or to the thickness of said body. If the body 3 has a flaw capable of reflecting a pulse of ultrasonic vibrations or waves, the voltage pattern at the output of unit 7 will still be as shown, except that the spacing 25 between adjacent pulses 23a, 23b, 23c, etc., will be that corresponding to the pulse round trip travel time from the surface 4 to said flaw and back. The same change of pattern spacing will obviously occur if the pulses are sent through a portion of the body 3 having a decreased thickness. If no coupling medium 6 is used, the transmitted pulse 22 and the first reflected pulse 23a are merged into one with regard to the following reflected pulses 23b, 23c, 23d, etc.

It is thus the time or spacing value 25, or a change therein, that contains the intelligence it is desired to indicate or record. Since, however, the value of 25, under ordinary testing conditions is very small, and a direct measurement and recording thereof might therefore entail considerable difficulty and result in considerable error, it is preferred, according to the present invention, to determine said value by raising a voltage in a series of steps of equal magnitude, said steps corresponding to the reflected pulses, and converting the stepwise voltage thus obtained to a voltage smoothly rising with a uniform slope. This slope, which may be readily determined by electronically differentiating the voltage rise with regard to its duration time, is in such case directly proportional to the number of pulses reflected per unit time or inversely proportional to the thickness of the body under test.

Figure 3:
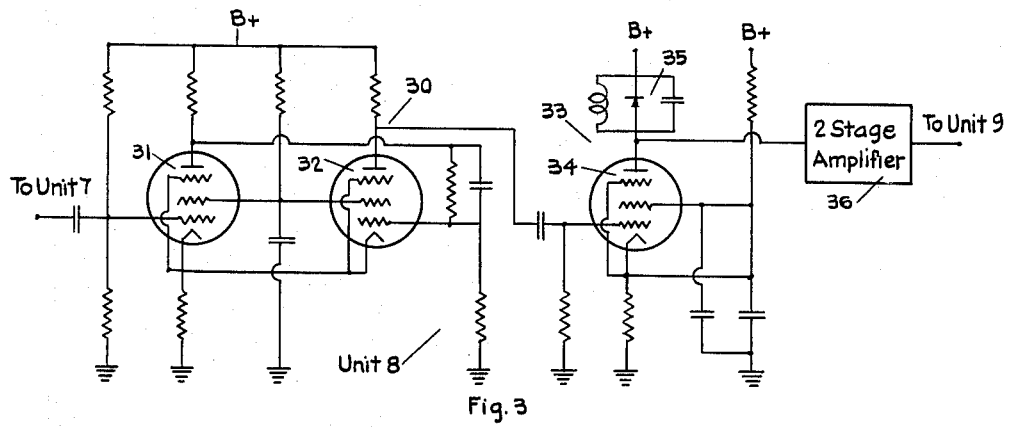
Fig. 3 is a schematic circuit of the shaping and limiting amplifier unit 8 of Fig. 1.

As stated above, and with reference to Figs. 1 and 2, the pulses received by the unit 7 appear, after suitable amplification and rectification therein, in the shape shown on line b. These pulses are then fed to the shaping and limiting amplifier unit 8. The essential elements of a unit of this type suitable for the purposes of this invention are diagrammatically shown in Fig. 3 as consisting of a limiting or trigger section 30, comprising pentodes 31 and 32, and a shaping amplifier section 33, comprising a pentode 34 having a damping diode 35, such for example as a germanium diode, connected to the plate circuit thereof. The unit 8 may be connected to the next unit 9 through a conventional two-stage amplifier 36. The effect of the shaping section 33 is to give the impulses received by the unit 8 equal widths, and that of the limiting or trigger section 30 is to give all pulses above a certain predetermined minimum an equal amplitude and rise time while entirely suppressing pulses below said predetermined minimum amplitude, with the result that the pulses 22 and 23 (a, b, c, d, e) applied to the input of unit 8 are transformed therein into pulses such as shown at 27 and 28 on line E. The pulses 27 and 28 are delivered by the two stage amplifier 36 to the input of the staircase integrator unit 9 connected thereto.

Figure 4:
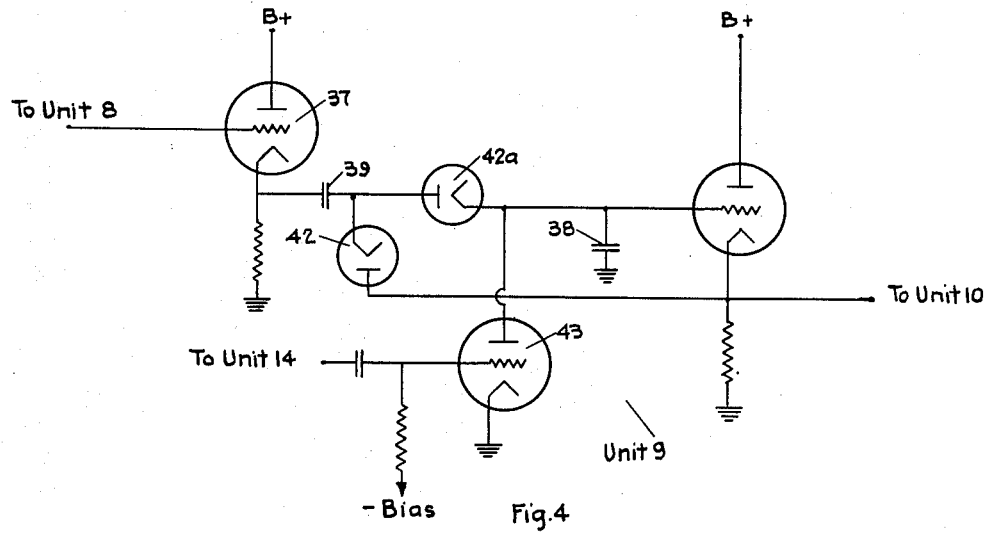
Fig. 4 is a schematic circuit of the staircase integrator unit 9 of Fig. 1.

The staircase integrator 9 diagrammatically shown in Fig. 4, is a cathode follower circuit connected to the output of unit 8 through a tube 37, a condenser 39 of relatively very small capacity and parallel diode tubes 42 and 42a. The essential element of the integrator is the grounded storage condenser 38 of relatively large capacity, such as from 10 to 100 times the capacity of condenser 39. Pulses 28, fed to the integrator circuit through the condenser 39, cause the voltage across the storage condenser 38 to rise in a series of equal steps, each of said steps corresponding to one of the pulses 28, as shown at 40 on line F. The rate of voltage rise across the storage condenser 38 is thus directly proportional to the frequency of said pulses or inversely proportional to the thickness of the body under test.

In order that the rise of the staircase voltage may always start from the same reference point or level, and to eliminate the effect of the transmitted pulse 22, the storage condenser 38 is discharged by the action of transmitted or synchronizing pulses during each repetition period, that is during a period corresponding to the spacing between two consecutive pulses 21 and 21A, line A or 22 and 22A on line B.

Figure 5:
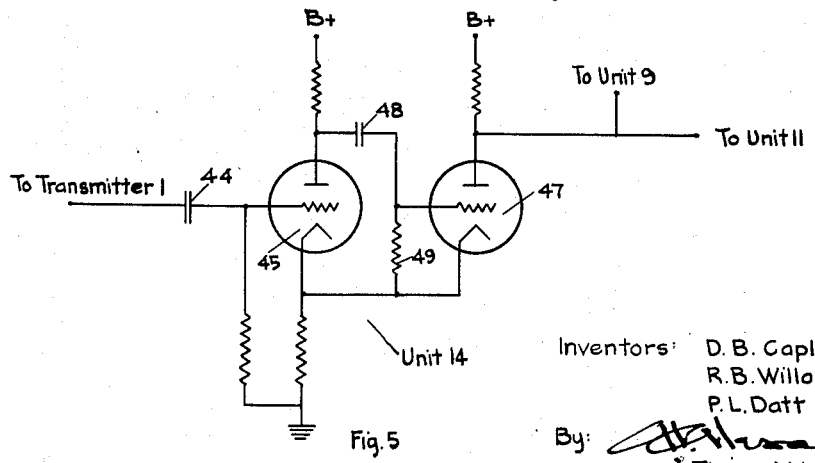
Fig. 5 is a schematic circuit of the delay multivibrator unit 14 of Fig. 1.

To obtain this desired recycling discharge signal, a synchronizing pulse produced by the transmitter 1 is brought therefrom to a delay multivibrator circuit 14. This pulse is shown at 41 on line C as slightly leading the transmitted pulse 21. An example of a suitable delay multivibrator circuit is diagrammatically shown in Fig. 5 as connected to the transmitter 1 through a condenser 44. The delay multivibrator circuit of Fig. 5 is adjusted to a mode of operation wherein the tube 47 is normally on, or passing current, while the tube 45 is off. By a proper selection of the values of a condenser 48 and a resistance 49 in the circuit linking the plate of the tube 45 to the grid of tube 47, the arrival of a synchronizing pulse 41 may be made to trigger the delay multivibrator circuit to a temporary state of operation during which the tube 45 becomes conductive while tube 47 is not, which produces a square wave in the output of the delay multivibrator circuit, as shown at 50 on line D. The duration of the temporary state producing the wave 50 can be easily regulated by suitably adjusting the values of the constants 48 and 49, and is designed to terminate before the arrival of the first echo pulse 28, as can be seen from lines D and E.

The square wave output of the delay multivibrator 14 is applied as a positive bias to the grid of tube 43 of the integrator circuit 9, causing it to become conductive for the duration of the square wave, thus shorting the storage condenser 38 and permitting it to discharge, whereby the system is returned to its "no signal" condition, so that no stepwise rise of voltage is permitted to take place during the period of application of the square wave 50, which eliminates the transmitted pulse 22 or 27 from the following circuits.

The output of the staircase integrator circuit 9 is fed to the smoothing and differentiating unit 10, diagrammatically shown in Fig. 6, where the stepwisely rising or staircase voltage 40 is smoothed or converted to a linearly changing voltage having a proper slope, as shown at 52 on line G, by means comprising a cathode follower tube 55, a diode 56 and a pentode 57 having a condenser 58 between its grid and plate circuits. The resulting smoothly changing voltage is then electronically differentiated by means of a circuit comprising essentially the pentode 57, a high resistance 59 and an inductance 62, to give an output voltage 54, shown on line H, which is directly proportional to the slope of the line 52 and inversely proportional to the thickness of the body under test. The output current of unit 10 is delivered, preferably through an amplifier-inverter 64, to the unit 11.

Since the voltage 54 appears at the output of the differentiator unit 10 only for the duration of the echo pattern, that is, only during the period when the group of pulses 28, corresponding to the reflected pulses 23, is passing through the system, and since that period may be of extremely small duration, such as 40 microseconds, it is desirable that the voltage 54 be stretched or maintained by the system for most of the repetition period, so that a voltage having a duration sufficient for actuating a recorder may be obtained.

In order to accomplish this result, the output of the differentiator unit 10 is fed to a first and a second stretcher stages or units 11 and 12, as diagrammatically illustrated in Fig. 7.

This circuit is essentially a cathode follower circuit comprising a condenser 70 in the cathode circuit of a first stretcher tube 71, and a condenser 73, having a high resistance 75 in parallel therewith in the cathode circuit of a second stretcher tube 76. The condenser 70 becomes charged to the maximum voltage supplied by the output of unit 10. As condenser 70 has no discharge path, its voltage is maintained at the same level in time, or stretched, as shown at 84, line I. Each repetition period, condenser 70 must be discharged and recharged in order that the output voltage supplied to the recorder may follow the variations of thickness of the object under test. To discharge this condenser by shorting it, another recycling discharge tube 78 is operated from the delay multivibrator 14, whereby the stretcher condenser 70 is brought to zero voltage, as shown at 85, line I, every time that a synchronizing pulse 41 causes the delay multivibrator to produce a pulse 50. The stretcher condenser 70 remains discharged until the signal 52 is again received from the differentiator 10. The time during which the output of stretcher 11 is zero should preferably be a small fraction, such for example as one-tenth of the repetition period. Except for the discharge time, the output of stretcher 11 is the desired voltage to be reported. To eliminate errors due to the voltage drop during the discharge period, a second stretcher 76 is used. A condenser 73, carried in the cathode circuit of the second stretcher tube 76 of this circuit is also charged to the peak voltage of the output of unit 10, but in this case a resistor 75 is connected across the condenser to provide a leakage path with a high time constant. Since the output of tube 71 is the input to tube 76, the charge on the condenser 73 will be maintained constant for most of the repetition period as shown on line J. During the period when the condenser 70 is being discharged to zero voltage, condenser 73 will discharge through its parallel resistor 75. As the time constant for this discharge is made large compared to the discharged period of condenser 70, only a small change of voltage will occur in the output of the stretcher circuit 12 during this period, as shown at 86 on line J.

It has been found practical to make the time-constant of the resistor-condenser circuit of circuit 12 about equal to one repetition period of the system. The output voltage of the stretcher circuit 12 will then follow voltage decreases of the stretcher circuit with sufficient rapidity for use with most recorders, and will show only a small change during the short discharge period 86.

The output of the stretcher may be connected to the input of any suitable recorder, preferably through a cathode follower circuit to provide a low impedance output for the recorder.

It will thus be seen that the present invention is directed to a method whereby suitably shaped electric power capable of actuating a recorder can be produced by the closely spaced repetitive events or pulses which it is desired to record. It will also be seen that the present invention embraces a system embodying a combination of elements necessary for carrying out said method, it being understood, however, that the invention is in no way limited or bound to the particular elements, units or circuits described or illustrated hereinabove by way of examples, since various modifications or substitutions of said circuits may be effected by those familiar with the art of electronics without departing from the spirit of the present invention.

We claim as our invention:

1. In a method for recording a series of repetitive events closely following each other, the steps of producing a series of electrical pulses corresponding to said events, causing a potential to rise in a series of steps each corresponding to one of said pulses, converting said stepwisely rising potential to one rising substantially in a straight line, determining the slope of said line, producing a voltage having an amplitude proportional to the slope of said line, and recording said last voltage.

2. In a method for recording a series of events closely following each other at equal intervals, the steps of producing a series of electrical pulses corresponding to said events, amplifying said pulses to an equal amplitude, causing a potential to rise in a series of steps each corresponding to one of said pulses, converting said stepwisely rising voltage to one rising substantially in a straight line, determining the slope of said line, producing a voltage having an amplitude proportional to the slope of said line, and recording said last voltage.

3. In a method for determining the spacing between two adjacent events in a series of events rapidly following each other at equal intervals, the steps of producing throughout a predetermined time period a series of electrical pulses corresponding to said events, amplifying said pulses to an equal amplitude, causing a voltage to rise in a series of steps each corresponding to one of said pulses, converting said stepwisely rising voltage to one rising substantially in a straight line, electrically differentiating said voltage with regard to time to obtain the slope of said line, producing a voltage having an amplitude proportional to the slope of said line, and recording said last voltage.

4. In a method for recording the spacing between two successive reflections of a transmitted pulse, the steps of transmitting a pulse at equal relatively long intervals into a medium having at least a first and a second reflecting surfaces, receiving a train of equally spaced pulses reflected from said first and second surfaces, amplifying said reflected pulses to an equal amplitude throughout a predetermined relatively short time period occurring wholly within the interval between two transmitted pulses, causing a voltage to rise in a series of steps each corresponding to one of said reflected pulses, converting said stepwisely rising voltage to one rising substantially in a straight line, electrically differentiating said voltage with regard to time to obtain the slope of said line, producing a voltage having an amplitude proportional to the slope of said line, maintaining said voltage during a major portion of the repetition cycle occurring between two transmitted pulses, and permitting said voltage to decrease by a small amount during the period between the arrival of the transmitted pulse and the first reflected pulse.

5. In a system for recording consecutive events, a first circuit responsive to said events for producing a series of electrical pulses corresponding to said events, a second circuit connected to the output of the first circuit, said second circuit comprising potential storage means, means in said second circuit for causing the pulses received thereby from the first circuit to raise the potential of said potential storage means in a series of steps corresponding to said pulses, a third circuit connected to the output of the second circuit, means in said third circuit for converting the stepwisely rising voltage output of the second circuit to a voltage rising substantially in a straight line and for producing a voltage having an amplitude proportional to the slope of said straight line, and a recorder connected to the output of said third circuit.

6. In combination with a transmitter for sending a transmitted pulse through a medium having at least a first and a second reflecting surfaces, a system for recording the spacing between two reflections of said transmitted pulse, comprising a receiver circuit for receiving a train of equally spaced pulses reflected respectively from said first and second surfaces on the arrival thereto of a transmitted pulse, a shaping amplifier circuit connected to the output of said receiver circuit for amplifying said reflected pulses to an equal amplitude throughout a predetermined relatively short time period occurring wholly within the interval between two transmitted pulses, an integrator circuit connected to the output of said shaping circuit, a condenser in said integrator circuit, thermionic tube means in said integrator circuit for raising the potential of said condenser in a series of steps each corresponding to an energization of said integrator circuit by the reflected impulses applied to the input thereof, a differentiator circuit connected to the output of the integrator circuit comprising means for converting the stepwisely rising potential of the integrator circuit to a voltage rising substantially in a straight line, means for differentiating said voltage with regard to time to obtain the slope of said line, and means for producing a voltage having an amplitude proportional to said slope, stretcher circuit means connected to the output of the differentiator circuit for maintaining said last voltage at a constant value during a major portion of the repetition cycle occurring between two transmitted pulses, delay multivibrator circuit having its input connected to the output of the transmitter and its output connected in parallel to said integrator circuit and said stretcher circuit for periodically decreasing the output voltage of said integrator circuit, and a recorder connected to the output of said stretcher circuit.

DONALD B. CAPLES.
RICHARD B. WILLOUGHBY.
PAUL L. DATT.

References Cited in the file of this patent

UNITED STATES PATENTS

| Number | Name | Date |
|---|---|---|
| 2,496,338 | Barton, Jr. | Feb. 7, 1950 |